United States Patent
Forster et al.

(10) Patent No.: US 6,722,830 B2
(45) Date of Patent: Apr. 20, 2004

(54) FASTENER DRIVING HEAD

(75) Inventors: Hubert Forster, Moorenweis (DE); Michael Werner, München (DE); Franz-Xaver Huber, Günzlhofen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/210,968

(22) Filed: Aug. 2, 2002

(65) Prior Publication Data

US 2003/0053883 A1 Mar. 20, 2003

(30) Foreign Application Priority Data

Aug. 3, 2001 (DE) .......................... 101 38 222

(51) Int. Cl.$^7$ .................. F16B 39/26; F16B 39/282
(52) U.S. Cl. .............. 411/188; 411/412; 411/959
(58) Field of Search ................ 411/187, 188, 411/189, 412, 957, 959

(56) References Cited

U.S. PATENT DOCUMENTS

| | | | | | |
|---|---|---|---|---|---|
| 3,370,631 A | * | 2/1968 | James | .................. | 411/188 |
| 5,183,359 A | * | 2/1993 | Barth | .................. | 411/188 |
| 6,206,737 B1 | * | 3/2001 | Bonilla et al. | ......... | 411/188 X |
| 6,318,940 B1 | * | 11/2001 | Mitts | .................. | 411/188 |

* cited by examiner

*Primary Examiner*—Neil Wilson
(74) *Attorney, Agent, or Firm*—Sidley Austin Brown & Wood, LLP

(57) ABSTRACT

A fastener is formed of an axially extending shaft (2) and a driving head on the end directed away from the setting direction, and has on its underside or first side (9) for the prevention of unintended loosening, a plurality of webs (12) extending radially from the longitudinal axis (L) of the shaft up to the external periphery (11) of the underside (9). The webs (12) having a substantially trapezoidal cross-section, are limited by a face surface (13) on the underside (9), extending between two flank surfaces.

9 Claims, 2 Drawing Sheets

FASTENER DRIVING HEAD

BACKGROUND OF THE INVENTION

The invention relates to a fastener comprised of an at least in part axially extending externally threaded shaft and a driving head adjoining the trailing end facing opposite the leading end to be inserted first into a structure, the driving head has on its side facing toward the leading end a plurality of radially extending, separated webs spaced outwardly from the axis of the shaft up to the external circumferential edge of the side facing toward the leading end. The webs have an essentially trapezoidal cross section limited by a face surface directed toward the leading end and two flank surfaces.

Fasteners of the type described above are used not only in construction but find use in many other areas such as vehicle construction, component construction and the like. Webs situated on the side of the driving head facing in the insertion direction serve to secure the fastener against unintended loosening. Particularly in applications in which the fastener is exposed to strong vibration, for example in a vehicle or machine, the webs prevent unintended loosening of the connection established by the fastener.

U.S. Pat. No. 3,640,326 discloses such a fastener formed of a shaft and a connected driving head on the end facing away from the insertion direction. On its side facing in the insertion direction a plurality of separate webs are arranged extending radially from the axis of the shaft up to the radially outer edge of the side. The webs have an essentially trapezoidal cross-section.

The advantage of the known fastener consists in that at the time of tightening the fastener to a structural part for example, the webs at least partially penetrate into the surface of the structural part and consequently establish a positive form locking and a friction-locking connection in the insertion or setting direction between the driving head and the structural part, by virtue of which the fastener is secured against unintended loosening.

The drawback of the known fastener is the fact that at the time of tightening the fastener to a surface, for example, the head is subjected to a very high torque and this results in a twisting off of the head from the shaft; particularly in situations in which a motor-driven screwdriver device is used there is the risk of excessive turning between the driving head and the shaft.

SUMMARY OF THE INVENTION

The primary object of the present invention is to create a fastener that is resistant to excessive twisting forces. Moreover, the fastener is resistant to unintended loosening, and is secured against unintended loosening.

The object is achieved according to the invention in that the radially extending space between the flank surfaces of two adjacent webs is constant over their entire radial extent.

By virtue of the fact that the spacing of the flank surfaces is constant the face surfaces of the webs increase with increasing distance from the axis of the shaft and consequently also the friction surface, since the face surfaces of the webs are configured in segments. By varying the total surface of all of the webs arranged on the side facing in the insertion or setting direction the configuration of the maximum tightening torque can be defined. This results in the creation of a safety device, that prevents twisting off of the driving head from the shaft, particularly when using motor-driven screw driving devices. Furthermore, for example, it is possible to configure the face surface of the webs in different sizes and structures for fasteners for use with different receiving materials such as, for example, concrete, wood, or plastic and so, for example, prevent destruction of the connection by over-tightening a shaft in the bore hole.

The webs advantageously exhibit, on the external circumference, a width extending in the peripheral direction that corresponds approximately to the circumferential space of the lateral or flank surfaces of two adjacent webs to the effect of creating a large face surface of the webs, which, when tightening the fastener in, for example, a component, results in high friction between the driving head, in particular the webs on the underside of the driving head, with the surface of a structural component or receiving material.

Preferably the two corresponding flank surfaces of a web include a base angle of approximately 90° to assure optimum penetration into the surface.

Advantageously, the face surface runs perpendicularly to the axis of the shaft so that the surface is not heavily damaged by engagement of the webs. Thus, on the one hand splitting of the surface is prevented and on the other hand foreseeable basic conditions are assured.

The webs have a height h extending preferably in the setting direction relative to the underside of the driving head that corresponds to 0.009 to 0.015 times the external diameter of the underside in order to assure optimum frictional characteristics.

To prevent premature erosion of the webs into the surface the radially extending edges formed by the corresponding flank surfaces and face surfaces are advantageously rounded. This further prevents unnecessary cutting away of material from the surface of the structural component or receiving material by the rotating webs of the driving head.

In order to assure optimal fastening behavior, adjacent webs are advantageously arranged transverse to the shaft axis by an angle of 5° to 10° relative to each other.

The spacing of the webs radially outwardly from the shaft corresponds in a preferred embodiment to 0.3 to 0.4 times the external diameter of the underside in order to prevent premature engagement of the webs in the region of the shaft, since at the surface in the region of the shaft, for example, material of the structural component is present that is cut away from it by the shaft.

BRIEF DESCRIPTION OF THE DRAWING

The invention is more completely explained in the following read together with an exemplary embodiment, wherein.

DETAILED DESCRIPTION OF THE INVENTION

Figure 1:
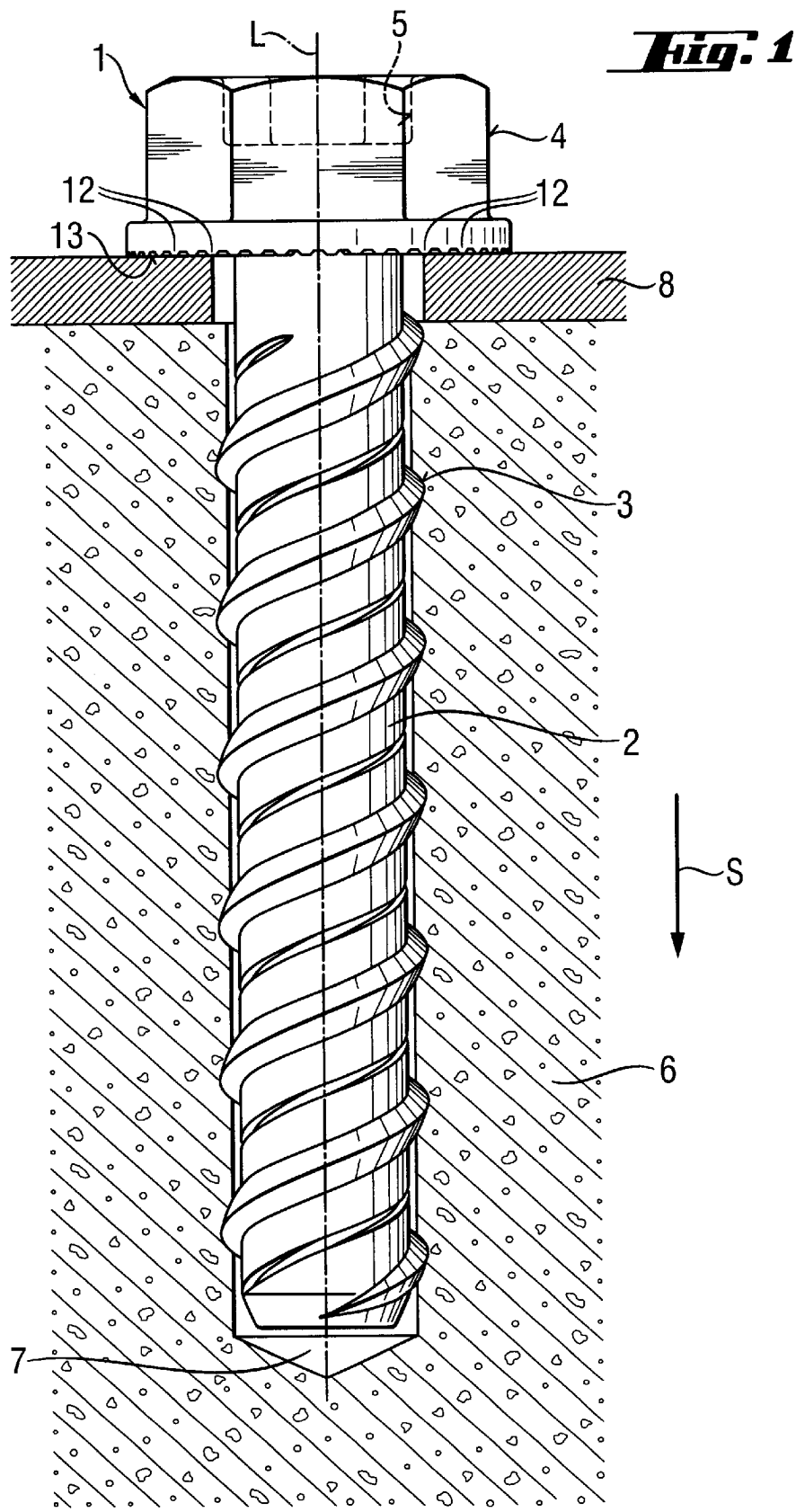
FIG. 1 is an axially extending view of a fastener inserted in a receiving material.
Figure 2:
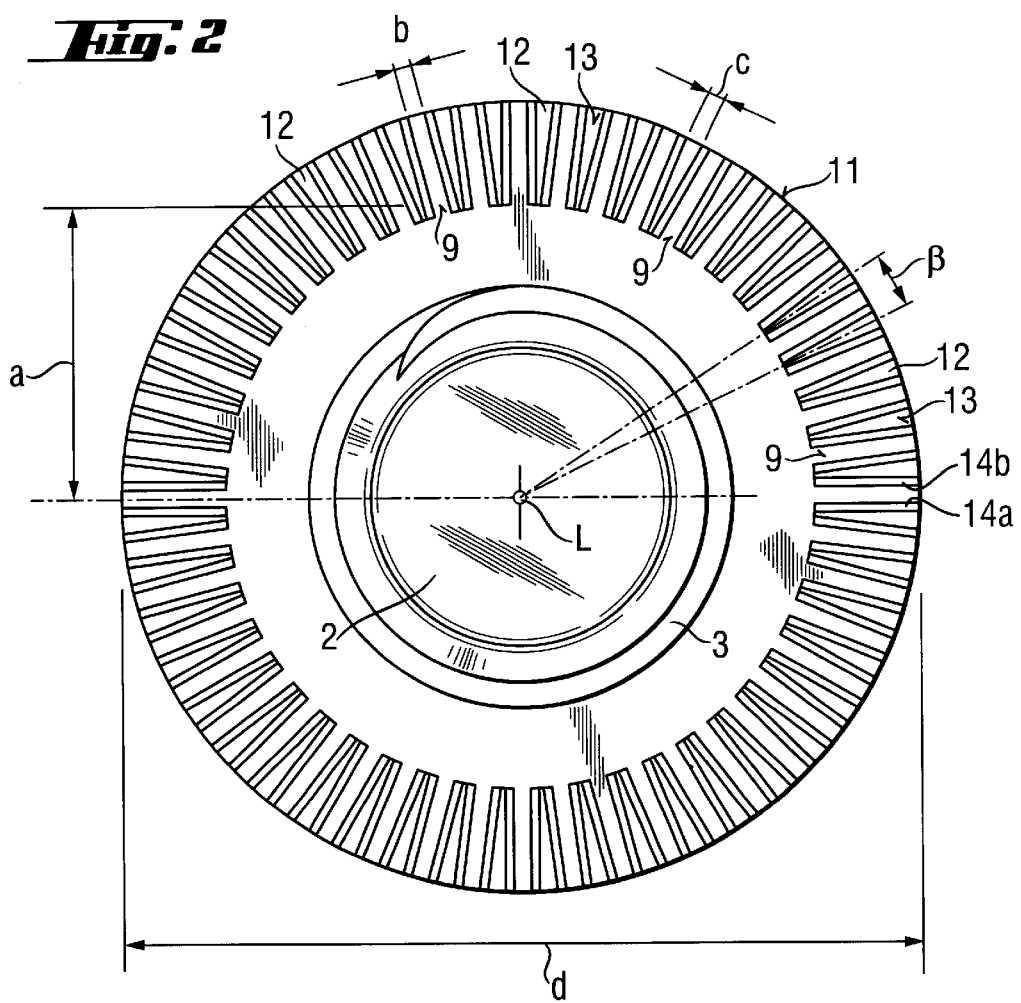
FIG. 2 is a plan view of the underside of the driving head shown in FIG. 1.
Figure 3:
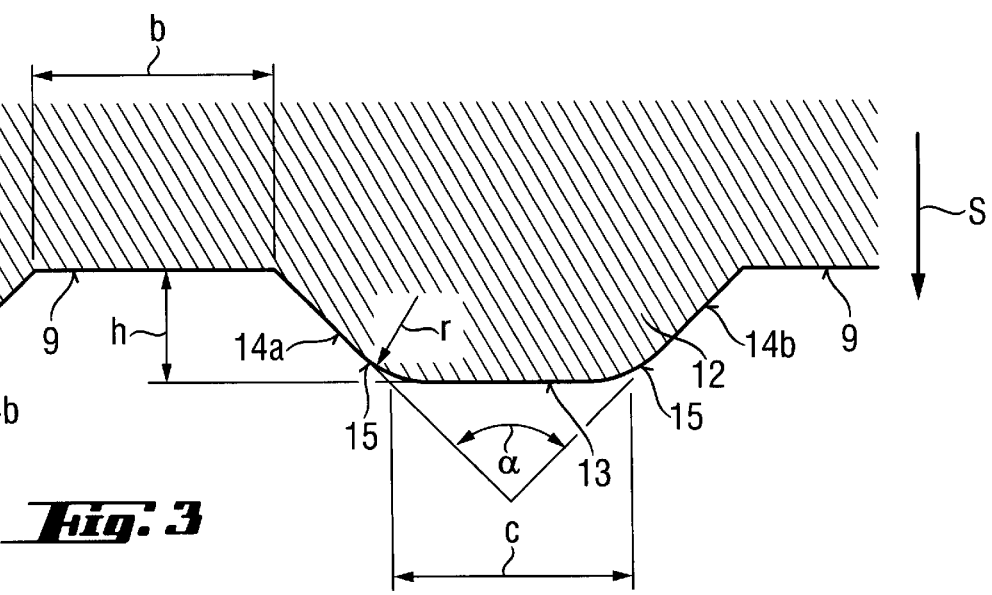
FIG. 3 is an enlarged cross section through a web of the driving head shown in FIG. 1.

FIGS. 1 to 3 represent a fastener according to the invention comprised of an axially extending shaft 2 having at least in part an axially extending external thread 3 and a driving head 1 joined at the trailing end of the shaft, the driving head is shaped as a polygonal head 4 with an hexagonal socket 5 in its upper surface. The fastener is a screw for use in concrete and is set into a bore hole 7 created in a concrete receiving material 6 and the driving head 1 compresses a structural member 8 against the receiving material 6 as is more particularly depicted in FIG. 1.

At its first side 9, facing in the setting direction, the driving head 1 has a plurality of webs 12 each having a substantially trapezoidal cross-section and extending radially outwardly at distance a from the axis L of the shaft 1 up to the external circumferential periphery 11 of the first side 9. The cross-section of the webs 12 is formed by a face surface 13 directed toward the leading end of the shaft and extending transversely of the axis L of the shaft; the face surface 13 has two flank surfaces 14a, 14b as is more particularly shown in FIG. 3. The peripheral space b of the flank surfaces of two adjacent webs over their total radial extent is constant. The two corresponding flank surfaces 14a, 14b of a web 12 include a base angle α of 90°; note FIG. 3. The webs 12, relative to the first side 9 have a height h extending in the setting direction which corresponds to about 0.011 times the external diameter d of the first side 9. Further, the radially extending edges 15 formed by the corresponding flank surfaces 14a, 14b and the face surfaces 13 are rounded off by a radius of curvature r, wherein the radius of curvature corresponds to 0.017 times the external diameter d. Adjacent webs 12 are spaced apart transverse to the axis L by an angle β of 7.5° relative to each other. Moreover, the distance a corresponds to 0.3–0.4 times the external diameter d of the first side 9.

What is claimed is:

1. A fastener comprises an axially extending shaft (2) with at least a partial axially extending external thread (3) and having a leading end to be inserted first into a structure and an trailing end, a driving head (1) formed on the trailing end and extending transversely outwardly from said shaft (2), said driving head (1) having a first side (9) facing toward the leading end of said shaft and an oppositely facing second side, a plurality of webs (12) extending circumferentially around said first side (9) and having a trapezoidal cross section and extending in the axial direction of said shaft (2) outwardly from said first side (9), said webs having a first end at a circumferential peripheral edge of said first side (9) and a second end spaced radially inwardly from said first end and radially outwardly from said shaft with an annular space free of said webs between the second ends of said webs and said shaft (2), said webs having outside surfaces facing towards said leading end of said shaft (2) comprising a face surface (13) spaced axially outwardly from said first side (9) and a pair of spaced flank surfaces (14a, 14b) extending from said first side (9) to said face surface (13), and a radially extending space (b) between said flank surfaces (14a, 14b) of adjacent said webs (12) being constant for the full radial extent thereof.

2. A fastener, as set forth in claim 1, wherein said webs (12) at the circumferential peripheral edge of said first side are spaced apart circumferentially by a width (c) corresponding approximately to said radially extending space (b) between said flank surfaces (14a, 14b) of adjacent said webs (12).

3. A fastener, as set forth in claim 1, wherein said flank surfaces (14a, 14b) of said webs include a base angle (α) of approximately 90°.

4. A fastener, as set forth in claim 1, wherein said face surface (13) of said webs extend substantially perpendicular to an axis (L) of said shaft (2).

5. A fastener, as set forth in claim 1, wherein said webs (12) extend axially outwardly from said first side (9) for a height (h) in the range of 0.009 to 0.015 times an external diameter (d) of said first side (9).

6. A fastener, as set forth in claim 1, wherein radially extending edges of said face surface (13) and said flank surfaces (14a, 14b) are rounded.

7. A fastener, as set forth in claim 1, wherein adjacent said webs are spaced apart in the circumferential direction at an angle (β) in the range of 5° to 10° relative to one another.

8. A fastener, as set forth in claim 1, wherein a spacing (a) between the second ends of said webs (12) and an axis (U of said shaft (2) is in the range of 0.3 to 0.4 times an external diameter (d) of said first side (9).

9. A fastener, as set forth in claim 1, wherein said webs (12) at the circumferential peripheral edge of said first side (9) are spaced apart circumferentially by a width (c) corresponding approximately to said radially extending space (b) between said flank surfaces (14a, 14b) of adjacent said webs (12), said flank surfaces (14a, 14b) of said webs include a base angle (α) of approximately 90°, said face surface (13) of said webs extend substantially perpendicular to an axis (L) of said shaft (2), said webs (12) extend axially outwardly from said first side (9) for a height (h) in the range of 0.009 0.015 times an external diameter (d) of said first side (9), radially extending edges of said face surface (13) and said flank surfaces (14a, 14b) are rounded, adjacent said webs are spaced apart in the circumferential direction at an angle (β) in the range of 5° to 10° relative to one another, and a spacing (a) between the second ends of said webs (12) and an axis (L) of said shaft (2) is in the range of 0.3 to 0.4 times an external diameter (d) of said first side (9).

* * * * *